United States Patent [19]

Funato

[11] Patent Number: 5,790,801
[45] Date of Patent: Aug. 4, 1998

[54] DATA MANAGEMENT SYSTEM

[75] Inventor: Nobuhiko Funato, Tenri, Japan

[73] Assignee: Sharp Kabushiki Kaisha, Osaka, Japan

[21] Appl. No.: 607,590

[22] Filed: Feb. 27, 1996

[30] Foreign Application Priority Data

May 26, 1995 [JP] Japan ............... 7-128424

[51] Int. Cl.$^6$ ............... G06F 13/00; G06F 12/00
[52] U.S. Cl. ............... 395/200.59; 395/200.71; 395/200.48; 395/200.41
[58] Field of Search ............... 395/610, 200.33, 395/200.41, 200.43, 200.47, 200.48, 200.49, 200.56, 200.57, 200.58, 200.59, 200.65, 200.69, 200.71; 370/235, 238

[56] References Cited

U.S. PATENT DOCUMENTS

| | | | |
|---|---|---|---|
| 4,414,620 | 11/1983 | Tsuchimoto et al. | 395/200.47 |
| 4,982,324 | 1/1991 | McConaughy et al. | 395/200.58 |
| 5,218,713 | 6/1993 | Hammer et al. | 395/200.49 |
| 5,274,762 | 12/1993 | Peterson et al. | 395/200.49 |
| 5,442,771 | 8/1995 | Filepp et al. | 395/200.56 |
| 5,502,816 | 3/1996 | Gawlick et al. | 395/200.57 |
| 5,535,334 | 7/1996 | Merkley et al. | 395/200.69 |
| 5,621,734 | 4/1997 | Mann et al. | 395/200.57 |
| 5,640,556 | 6/1997 | Tamura | 395/200.49 |
| 5,659,796 | 8/1997 | Thorson et al. | 395/200.71 |

FOREIGN PATENT DOCUMENTS

6-290090  10/1994  Japan.

*Primary Examiner*—Mark H. Rinehart
*Attorney, Agent, or Firm*—Nixon & Vanderhye, PC

[57] ABSTRACT

An information processing terminal is connected to data storage means through one or more communication means each of which is not always available. The information processing terminal includes small-capacity storage unit, local data management section and first communication management section. The data storage means includes large-capacity storage unit, master data management section and second communication management section. The first and second communication management sections select communication means and communication time to decrease the communication cost in an operation period with a certain width when reading or writing data from or in data storage means through communication means from an information processing terminal.

9 Claims, 10 Drawing Sheets

| TERMINAL | DATA STORAGE MEANS | COMMUNICATION MEANS | AVAILABLE-LINK DISCRIMINATION MEANS | COMMUNICATION COST ATTRIBUTE | | NEXT AVAILABLE TIME ATTRIBUTE |
|---|---|---|---|---|---|---|
| | | | | COMMUNICATION CHARGE | POWER CONSUMPTION | |
| 1100 | 2100 | INFRARED RADIATION | MANUAL | NO CHARGE | ⋯ | 24hr AFTER CREATION OR CHARGE |
| 〃 | 〃 | PHS (EXTENSION CALL) | AUTOMATIC | NO CHARGE | ⋯ | 36hr AFTER CREATION OR CHARGE |
| 〃 | 〃 | PHS NETWORK | AUTOMATIC | CHARGEABLE | ⋯ | 72hr AFTER CREATION OR CHARGE |
| 〃 | 2200 | RS-422 (LOCAL TALK) | MANUAL | NO CHARGE | ⋯ | (NO SCHEDULE) |
| 〃 | 〃 | PHS (EXTENSION CALL) | AUTOMATIC | NO CHARGE | ⋯ | 36hr AFTER CREATION OR CHARGE |
| 〃 | 〃 | PHS NETWORK | AUTOMATIC | CHARGEABLE | ⋯ | 72hr AFTER CREATION OR CHARGE |
| 〃 | 〃 | TELEPHONE NETWORK ~GATEWAY~RS-422 (LOCAL TALK) | MANUAL | CHARGEABLE | ⋯ | (NO SCHEDULE) |
| 1200 | 〃 | BUS | AUTOMATIC | NO CHARGE | ⋯ | ○ (ALWAYS AVAILABLE) |

| CREATION NODE | CREATION TIME | CHANGE TIME | CALLING CARD DATA BODY | | | STORAGE NODE | UPDATE RECOMMENDATION TIME | OWNER | SHAREABILITY |
| --- | --- | --- | --- | --- | --- | --- | --- | --- | --- |
| | | | NAME | COMPANY NAME | TELEPHONE NUMBER | | | | |
| 1100 | 94/08/27 | 95/03/12 | ... | ... | ... | 2200 | 95/03/13 | USER 1 | IMPROPER |
| ... | ... | ... | ... | ... | ... | ... | ... | ... | ... |

DATA MANAGEMENT SYSTEM

BACKGROUND OF THE INVENTION

1. Field of the Invention

The system of the present invention relates to a data management system for accessing a file or data in a different information processing unit from an information processing terminal through communication means or for sharing a file or data.

Particularly, the system of the present invention relates to a data management system for a portable information processing terminal driven by a battery and mounting only a small-capacity storage unit to utilize a comparatively-large-capacity storage unit of data storage means through one or more communication means (including RS-422, a modem, infrared communication, serial data transmission according to radio wave communication, a local area network, and wide-area network) all of which are not always available.

2. Description of the Related Art

A data management system for accessing a file or data in a different information processing unit from an information processing terminal through communication means or for sharing a file or data is recently proposed.

In the case of a portable information processing terminal mounting only a storage unit such as a small-capacity memory or disk, the storage unit is shown to a terminal user as if the storage unit is the storage unit of the user's terminal by using a mechanism (caching mechanism) for calling necessary data or data to be frequently accessed to the storage unit of the terminal together with data storage means for mounting a large-capacity storage unit for storing the master and backup of data or the data access efficiency of the storage unit is improved by decreasing the frequency of communication between the terminal and the data storage means. Particularly, when communication means between the terminal and the data storage means uses a network, a communication cost such as communication charge is required. Therefore, it is preferable to use a cache mechanism considered so as to decrease the communication cost.

As a caching mechanism considering the communication cost, the following system is disclosed in the Japanese Patent Application Laying Open (KOKAI) No. 6-290090. That is, under an environment in which one or more master-unit communication control means for accessing a remote file through generally low-speed and high-cost communication means such as a wide-area network are present and an information processing terminal accesses the remote file by high-speed low-cost communication means such as a local area network through the master-unit communication control means, the system improves the access efficiency while considering decrease of the communication cost by setting a high-speed large-capacity cache to the master-unit communication control means and setting cache data management means for obtaining information to select the master-unit communication control means capable of obtaining necessary data at the minimum communication cost to the information processing terminal.

The above system purposes only a case of reading data to a terminal from data storage means but it does not purpose a case of performing update entry for the data storage means from the terminal. In the case of the caching mechanism, however, it is necessary to exclude data from the caching object in accordance with a certain criterion (cache replacement algorithm) when a caching storage area is filled. In this case, when the data excluded from the caching object is data changed or created by the terminal, it is necessary to perform update entry for the data storage means.

Moreover, the system assumes that one or more communication means are present between the terminal and the data storage means and also indirectly assumes that every communication means is always available. However, if the mechanism disclosed in the Japanese Patent Application Laying Open (KOKAI) No. 6-290090 is directly applied to an environment in which one or more communication means all of which are not always available are present between the terminal and the data storage means, update entry is immediately performed by using only available communication means when an update entry request occurs and resultingly, communication means with the highest cost may be utilized. Actually in general, the above problem easily occurs in wide-area connection by radio because the wide-area connection requires the highest communication cost though it tends to be available anywhere compared to cable connection.

That is, a data management system which shows a user the storage unit of data storage means as if the storage unit is the storage unit of a user's terminal by calling necessary data or data to be frequently accessed to the storage unit of the user's terminal or efficiently accesses data by decreasing the communication frequency between the terminal and the data storage means has a problem that the communication cost which tends to increase for a conventional system should be decreased when a plurality of communication means all of which are not always available are present between the terminal and the data storage unit.

SUMMARY OF THE INVENTION

The present invention is made to solve the above problem.

A first system of the invention is that wherein first communication management means selects communication means and communication time when communication from information terminal means to data storage means is necessary and second communication means selects communication means and communication time when communication from the data storage means to the information terminal means is necessary.

A second system of the invention is that wherein said first communication management means and said second communication management means are respectively provided with available-link discrimination means for selecting communication means and communication time decision means for selecting communication time.

A third system of the invention is that wherein local data management means and master data management means are respectively provided with data attribute access means for accessing the attribute of the data to be managed.

The first system of the invention is constituted so that first communication management means selects communication means and communication time when communication from information terminal means to data storage means is necessary and second communication management means selects communication means and communication time when communication from the data storage means to the information terminal means is necessary. Therefore, it is possible not only to select the lowest-cost communication means to the data storage means for finding purposed data but also to delay communication time until the lowest-cost communication means is available within an allowable range without immediately performing communication when performing update entry of created or changed data for the data storage means. Thus, it is possible to decrease the cost of communication between the information terminal means and the data storage means.

The second system of the invention makes it possible to efficiently select communication means and communication time because first communication management means and second communication management means are respectively provided with available-link discrimination means for selecting communication means and communication time decision means for selecting communication time.

The third system of the invention makes it possible to properly select communication means and communication time in accordance with the attribute of data because local data management means and master data management means are respectively provided with data attribute access means for accessing the attribute of the data to be managed.

Further objects and advantages of the present invention will be apparent from the following description of the preferred embodiments of the present invention as illustrated in the accompanying drawings.

DESCRIPTION OF THE PREFERRED EMBODIMENTS

An embodiment with the structure of the present invention is described below by referring to the accompanying drawings.

Figure 1:
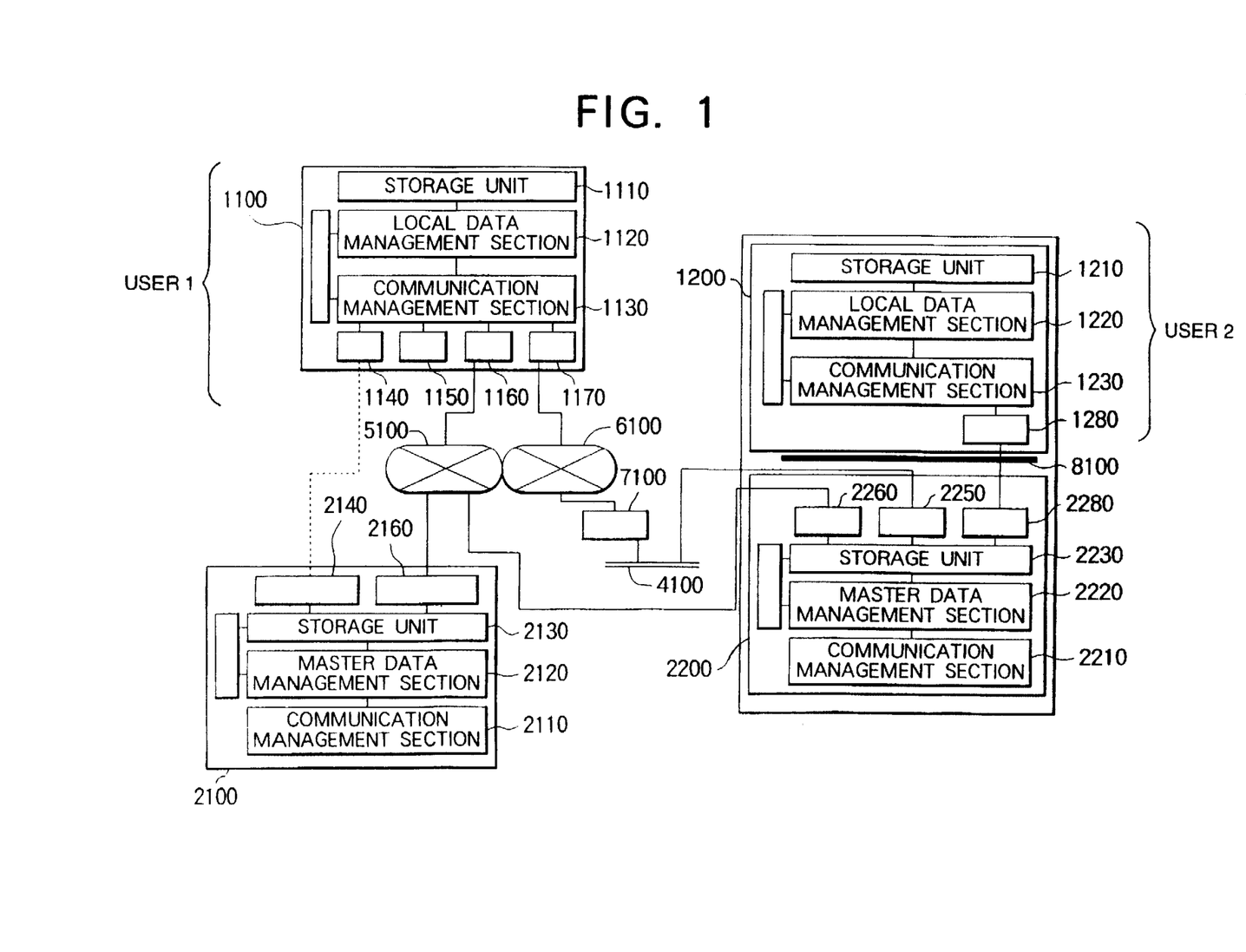
FIG. 1 is a block diagram showing the structure of the data management system of an embodiment of the present invention.

FIG. 1 is a block diagram showing the structure of the data management system of an embodiment of the present invention related to the invention of claim 1.

In FIG. 1, an information processing terminal 1100 utilized by a user 1 is portable and provided with an infrared communication interface 1140 according to IrDA protocol (of consortium), an RS-422 interface 1150 for connection with a local area network according to AppleTalk protocol (of Apple Inc.), an interface 1160 for a PHS (Personal Handy phone System) network 5100, and an interface 1170 for a telephone network 6100.

Data storage means 2100 is set in the house of the user 1, which is provided with an infrared communication interface 2140 according to the IrDA protocol and an interface 2160 for the PHS network 5100.

Data storage means 2200 is built in a computer of the company for which the user 1 and a user 2 work, which is provided with an interface 2250 for connection with a local area network 4100 and an interface 2260 for the PHS network 5100 according to the IrDA protocol (of IrDA consortium).

Moreover, an information processing terminal 1200 utilized by the user 2 is built in the above computer and connected with the data storage means 2200 by a bus interface 1280, a bus 8100, and a bus interface 2280.

The local area network 4100 according to AppleTalk protocol is installed with the computer of the above company and the data storage means 2200 is always connected to the network. The local area network 4100 is connected to the telephone network 6100 through a gateway 7100. Therefore, the terminal 1100 can also access the data storage means 2200 through the gateway 7100 and local area network 4100 from the telephone network interface 1170.

Moreover, a master file is present in storage units 2110 and 2210 of the data storage means 2100 and 2200 respectively, in which the master of the data accessed by a user is stored. Input and output of data to and from each master file are executed by master data management sections 2120 and 2220 respectively. Private data of the user 1 is stored in the data storage means 2100. Moreover, private data of the user 1, private data of the user 2, and shared data which can be accessed by any user are stored in the data storage means 2200. A user cannot access the private data of other user.

The storage units 1110 and 1210 of the terminals 1100 and 1200 respectively have a local file for storing a copy of data obtained from data storage means through communication means or data changed or created on a terminal. Input and output of data to and from each local file are executed by local data management sections 1120 and 1220 respectively.

Data-storage-means-side communication management sections 2130 and 2230 are set in the data storage means 2100 and 2200 respectively to control the communication between terminals and data storage means. Terminal-side communication management sections 1130 and 1230 are set in the terminals 1100 and 1200 respectively to control the communication between terminals and data storage means.

Figure 2:
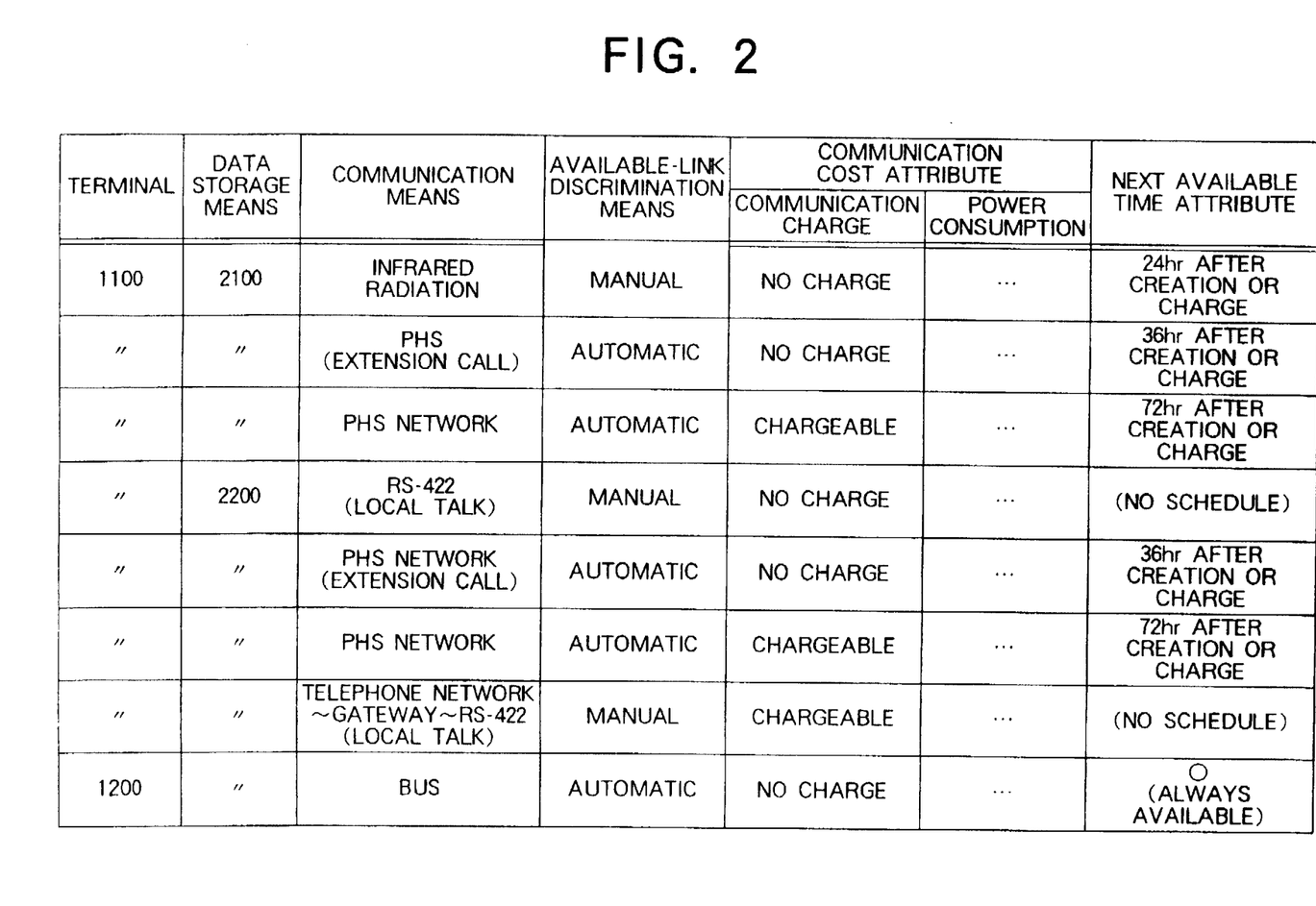
FIG. 2 is an illustration showing communication means between terminal and data storage means and its attribute (communication means attribute table)

The communication means attribute table in FIG. 2 shows the communication means from the terminal 1100 to the data storage means 2100 and 2200 or the communication means from the terminal 1200 to the data storage means 2200 according to the above communication interfaces and the attributes of them. In the case of the communication means attribute table of this embodiment, communication cost information includes communication charge and power consumption. The communication time decision means of the communication management section calculates various communication costs in accordance with these pieces of information to use them for judgment of communication time.

FIG. 2 is an illustration showing communication means between terminals and data storage means and their attributes.

Figure 3:
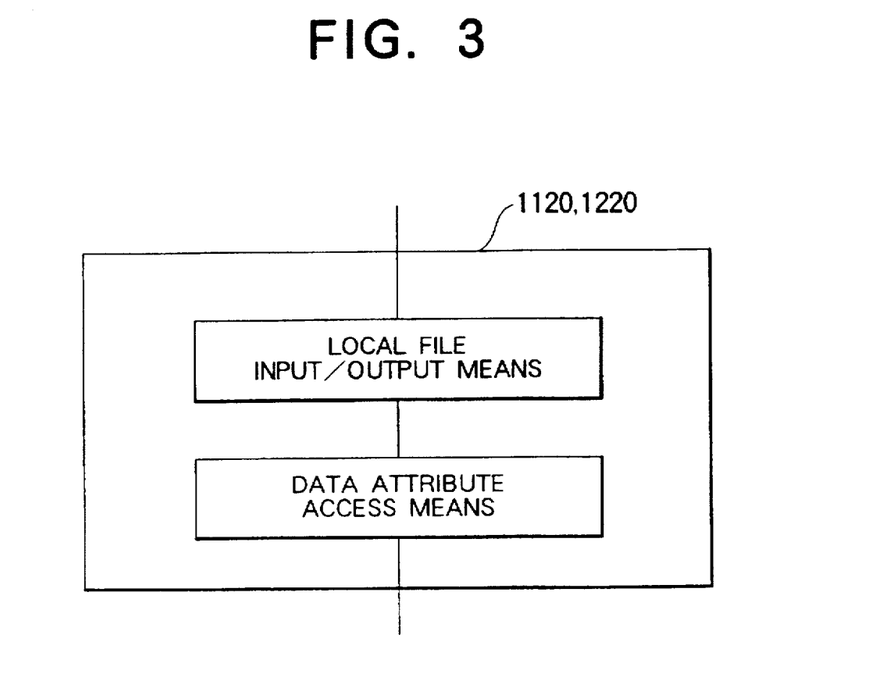
FIG. 3 is an illustration showing an embodiment of the local data management section of an information processing terminal.

FIG. 3 is a block diagram showing a structure of the local data management sections 1120 and 1220 in the information processing terminals 1100 and 1200 of the present invention related to the invention of claim 3. The local data management section includes local file input/output means for inputting/outputting the local files stored in the storage means 1110 and 1120 and data attribute access means for accessing the data attributes shown in FIG. 7.

Figure 4:
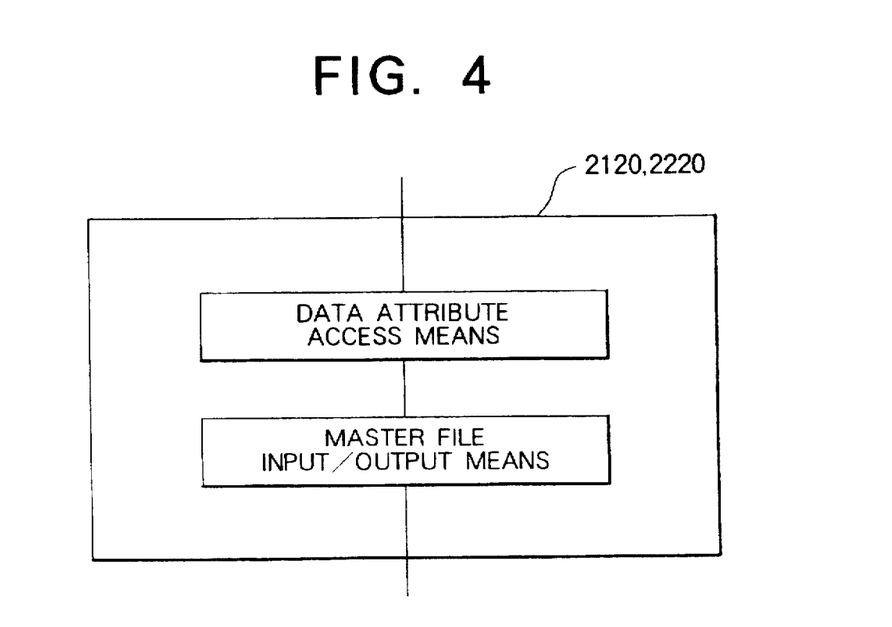
FIG. 4 is an illustration showing an embodiment of the master data management section of data storage means.

FIG. 4 is a block diagram showing a structure of the master data management sections 2120 and 2220 in the data storage means 2100 and 2200 of the present invention. The master data management section includes data attribute access means for accessing the data attributes shown in FIG. 7 and master file input/output means for inputting/outputting the master files stored in the storage means 2110 and 2210.

Figure 5:
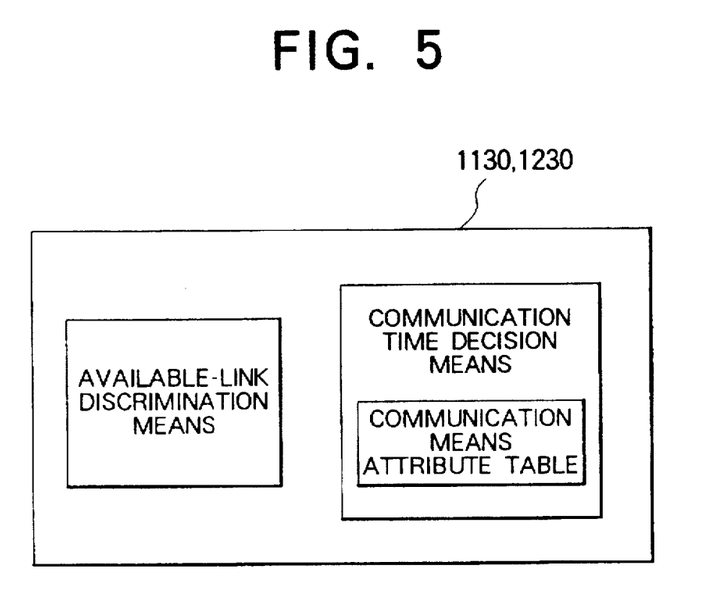
FIG. 5 is an illustration showing an embodiment of the communication management section of an information processing terminal and data storage means.

FIG. 5 is a block diagram showing a construction comprising the communication management sections 1130 and 1230 in the information processing terminals 1100 and 1200 and the communication management sections 2130 and 2230 in the data storage means 2100 and 2200 related to the invention of claim 2. The communication management section includes available-link discrimination means for discriminating available communication means and communication time decision means for deciding communication time. The communication time decision means includes the communication means attribute table shown in FIG. 2.

Figure 6:
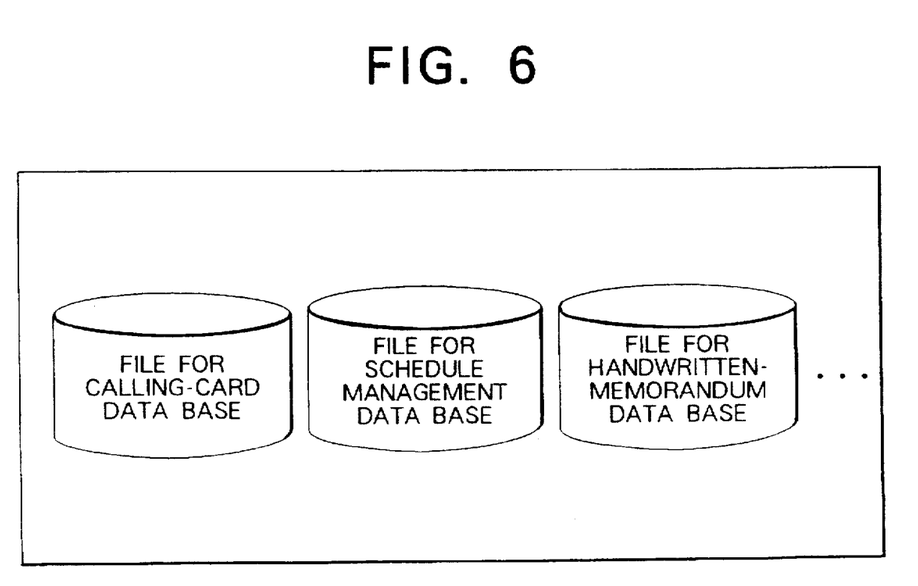
FIG. 6 is an illustration showing an embodiment of the data stored in a local file and a master file.

FIG. 6 shows a realization of the local file and master file of the present invention related to the invention of claim 3 on a storage unit, in which a plurality of files comprising collection of data whose type is determined for each type of application are arranged. In the case of this embodiment, data for applications such as a calling-card data base and a schedule-management data base are stored in each file as data in an information processing terminal such as an electronic pocketbook.

Figure 7:
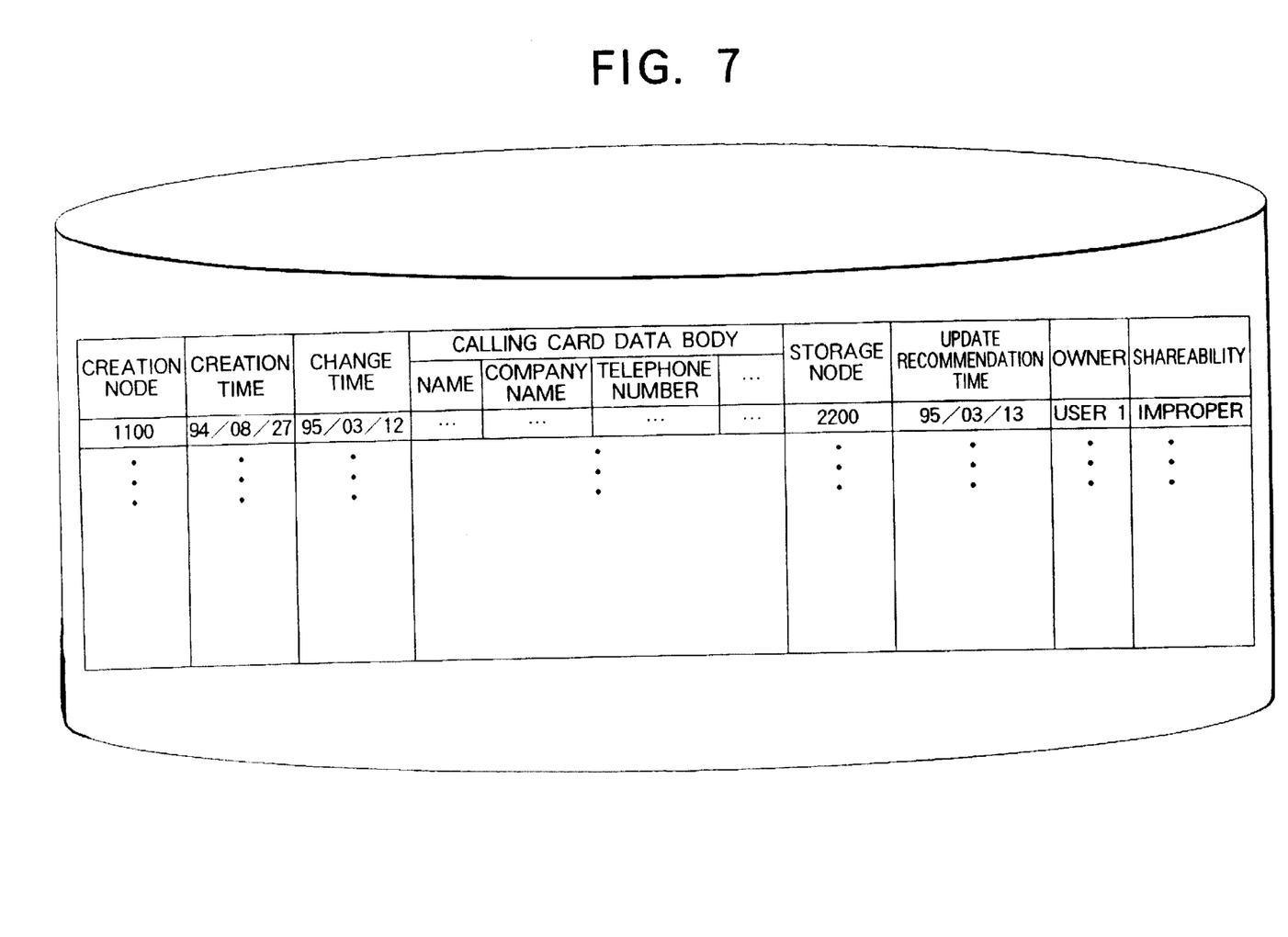
FIG. 7 is an illustration showing an embodiment of the data stored in a local file and a master file.

FIG. 7 shows an expression of the data stored in the local file and master file of the present invention related to the invention and each piece of the data has a structure in which not only the attribute information described but also attribute information including a creation node ID available to discriminate the uniqueness of data, data creation time, final data change time, owner's ID showing the owner of data, and commonness ID showing the shareability of data are added to the data peculiar to application. The data peculiar to application in this embodiment includes each piece of data in the calling-card data base in FIG. 6, showing that the data comprises a person's name, a company name, and a telephone number.

The following is the description of functions of the system of the present invention when a user retrieves, creates, or changes data through an information processing terminal by using the system of the present invention.

When the user retrieves the data meeting a certain condition, he inputs the condition by operating the information processing terminal 1100. In this case, the information processing terminal first retrieves only the data in the local file. Unless any desired data is found as the result of confirming the retrieval result, it is possible to preferentially select the data storage means connected by communication means with a lower communication cost and successively retrieve data by using the communication time decision means of the communication management section 1130. Because a copy of once retrieved data is accumulated in the local file, it may be possible to more easily find frequently-used data only by retrieving the data in the local file from the time of next retrieving. Moreover, when there are a plurality of routes to the data storage means 2100 and 2200, it is possible to automatically select communication means with a lower cost by the communication time decision means by preferentially using communication means with a low cost. Moreover, by successively utilizing communication means with a lower cost, the communication cost until finding purposed data may further be decreased.

When the user creates or changes data, he can create data in the local file or change the copied data in the local file by operating the information processing terminal 1100. The terminal automatically performs the processing for entering or reentering the created or changed data in the local file in the master file at a proper time by considering the output of the communication time decision means of the communication management section 1130 together with the update-recommendation-time attribute attached to the data. In this case, the proper time is an immediate time when the purposed data storage means 2100 and 2200 and communication means with a low-enough cost are available or, unless there is the above opportunity, a time when the lowest-cost communication means becomes available among communication means which are estimated in accordance with next available time attribute of each communication means, to become available for purposed data storage means within data update recommendation time. Whether communication means is available is decided by the available-link discrimination means of the communication management section 1130. The probability rises that the communication cost not at a certain point of time but in the operation period with a certain width decreases not by immediately performing update entry of the created or changed data for the master file but by postponing or delaying the update entry until the allowable-lowest-cost communication means is available in accordance with previous information on a time when each communication means is available. Moreover, because the user directly operates the data in the local file, an apparent response speed increases in the case of a terminal unit having a multitask processing function. Furthermore, by providing a mechanism for performing the processing to enter or reenter data in the master file without direct directions by the user, the user can imaginarily utilize large-volume data obtained by summing the data in all data storage means through a terminal. At the same time, because backup of past data is automatically accumulated in the master file, each terminal is exempted from backup operation.

Then, a realization of the operation when data is retrieved from an information processing terminal (hereafter referred to as a terminal) in the system structure in FIG. 1 is described below by referring to the flowcharts in FIGS. 8A and 8B. In the description below, however, a communication cost is shown in terms of a communication charge for the purpose of simplification.

When a user instructs a terminal to retrieve the data meeting a certain condition [S110], the terminal first retrieves the data in a file concerned in the local file in the terminal to generate a list of data meeting the condition [111]. Then, the terminal checks communication means corresponding to each of data storage means accessible from the terminal by using the available-link discrimination means of the communication management section 1130 [S112]. When there is a communication means which is currently available and requires no communication charge among communication means to a data storage means [S113], the terminal immediately utilizes the communication means and requests a corresponding data storage means to retrieve data [S114]. The data storage means performs retrieval in accordance with the request and returns the list of the resultingly-obtained data meeting the condition to the terminal through the communication means through which the request has been made. The terminal stores (caches) the returned data in the local file [S115]. In this case, the terminal displays every resultant data obtained in the local file as the result of retrieval to the user [S116]. After displaying the data, the terminal checks if there is any communication means currently available and requiring communication cost among communication means to a data storage means [S117]. If so, the terminal notifies the user that chargeable communication means are left and inquires the user of whether to perform retrieval through a communication means with the lowest communication cost [S118]. Only when the user instructs the terminal to execute retrieval, retrieval to the purposed data storage means is requested [S120], and the result is stored in the local file similarly to the above mentioned [S121] and displayed for the user [S122]. Thereafter, the terminal checks if there is any data storage means having no currently-available communication means [S123]. If so, the terminal notifies the user that the data storage means is not available at present [S124].

Then, a realization of the operation when data is created and changed in the system structure in FIG. 1 is more minutely described below by referring to the flowcharts in FIGS. 9A and 9B.

The data created by a user by using a terminal is first stored in the local file. The storage node attribute (data storage means to be stored), update-recommendation-time attribute, and owner attribute of data are set when the data is created [S211 and S212]. Moreover, when the user changes the data stored in the local file by using the terminal as a result of the above retrieval or creation, the data is stored in the local file again. Though there is no update recommendation time of retrieved data (though update entry of the data is unnecessary), when the data requiring no update entry is changed, the update-recommendation-time attribute is set at this point of time [S211 and S213]. Then, the terminal checks the data storage means which is a destination of entering or reentering the data [S214]. Then, the terminal checks by using the available-link discrimination means of the communication management section if there is any communication means currently available and requiring no communication charge for each data storage means [S215]. If so, the terminal immediately requests the communication means to enter or reenter the data using the data storage means as a storage node and not entered or reentered in the master file of the data storage means after created or changed in the corresponding data storage means [S216]. The update recommendation time of the entered or reentered data is set to "infinity" (that is, "update unnecessary in future") [S217]. Then, the terminal checks if there is any communication means currently available and requiring communication charge among the communication means to the data storage means which must be entered or reentered [S218]. If so, the closest update recommendation time of the data (referred to as the next update recommendation time [S219]) among data which must be entered or reentered is enumerated for each data storage means. When communication means with the lowest communication charge [S221] is available at present [S222] among the communication means in which the next available time obtained from the next-available-time attribute is closer than the next update recommendation time [S220] among all communication means to the data storage means, the terminal requests the communication means to enter or reenter the data in the corresponding data storage means [S223]. The update recommendation time of the entered or reentered data is set to "infinity" (that is, "update unnecessary in future" ) [S224].

When communication means in which the next available time obtained from the next-available-time attribute is closer than the next update recommendation time is not present [when the decision is "no" in S220] or communication means to the corresponding data storage means is not available [the decision is "no" in S222] and data which is not yet entered or reentered in the data storage means is left, these cases are postponed up to the time when the next entry or reentry is performed or communication means to data storage means becomes available due to other reason (to be described later).

Figure 10:
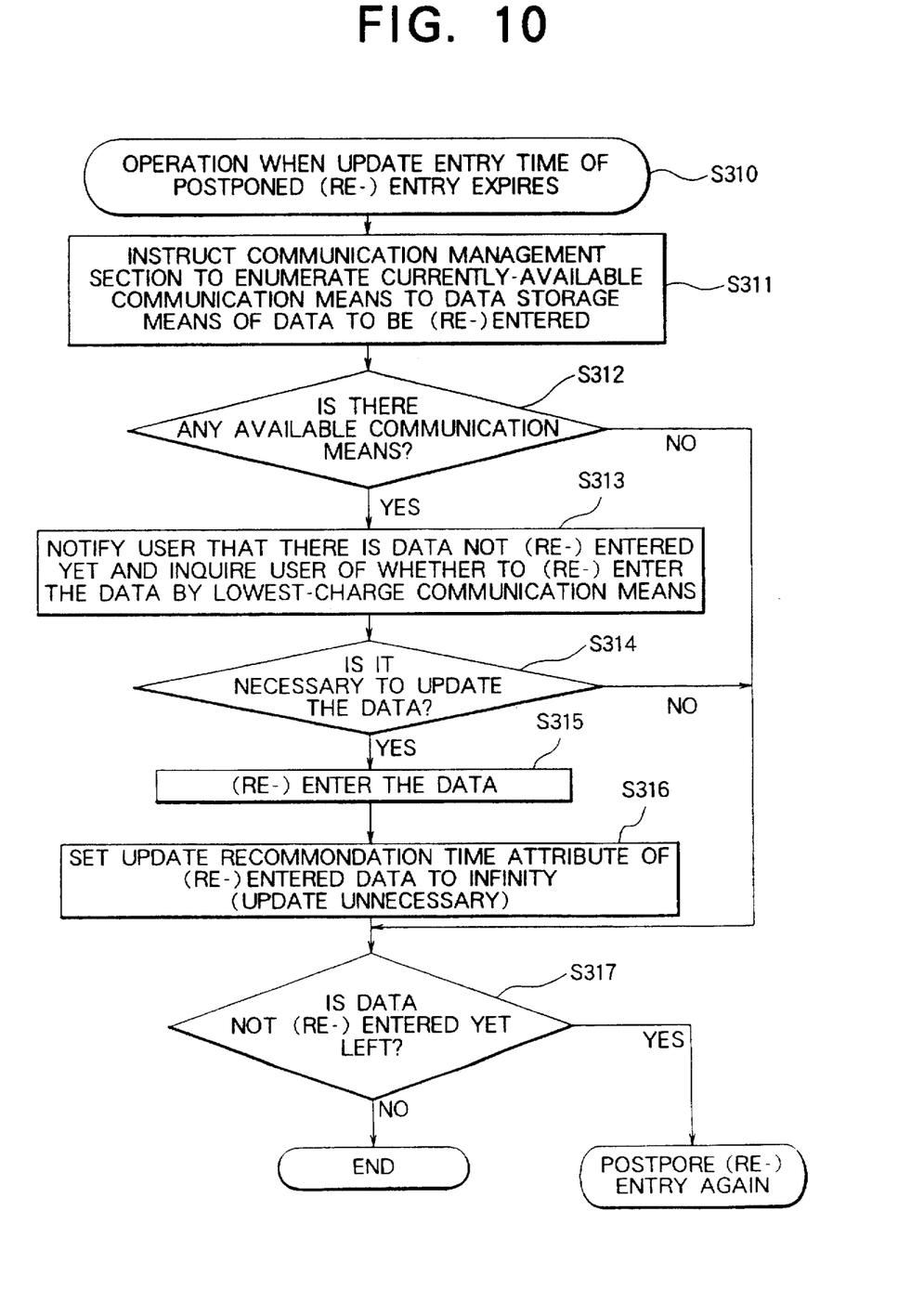
FIG. 10 is a flowchart showing an embodiment of the operation when the update entry time of postponed entry or reentry expires.

Then, a realization of the operation when the time of entry or reentry in data storage means thus postponed expires is described below by referring to the flowchart in FIG. 10.

The terminal checks how many communication means are available at present among those to the data storage means corresponding to the data to be entered or reentered [S311]. As a result, if even one communication means is available [S312], the terminal notifies the user that data to be entered or reentered is left and inquires the user of whether to enter or reenter the data through a communication means with the lowest communication charge [S313]. When the user instructs the terminal to enter or reenter the data [S314], entry or reentry of data in the data storage means concerned is requested [S315] and executed. The update recommendation time of the entered or reentered data is set to "infinity" (that is, "update unnecessary in future") [S316]. When the user instructs the terminal not to enter or reenter the data [when the decision is "no" in S314] or when there is no available communication means at the expiry of the postponed time [when the decision is "no" in S312] but data to be entered or reentered is left [when the decision is "no" in S317], the update recommendation time for the data is reset to a proper time and entry or reentry of the data is postponed again.

Figure 8A:
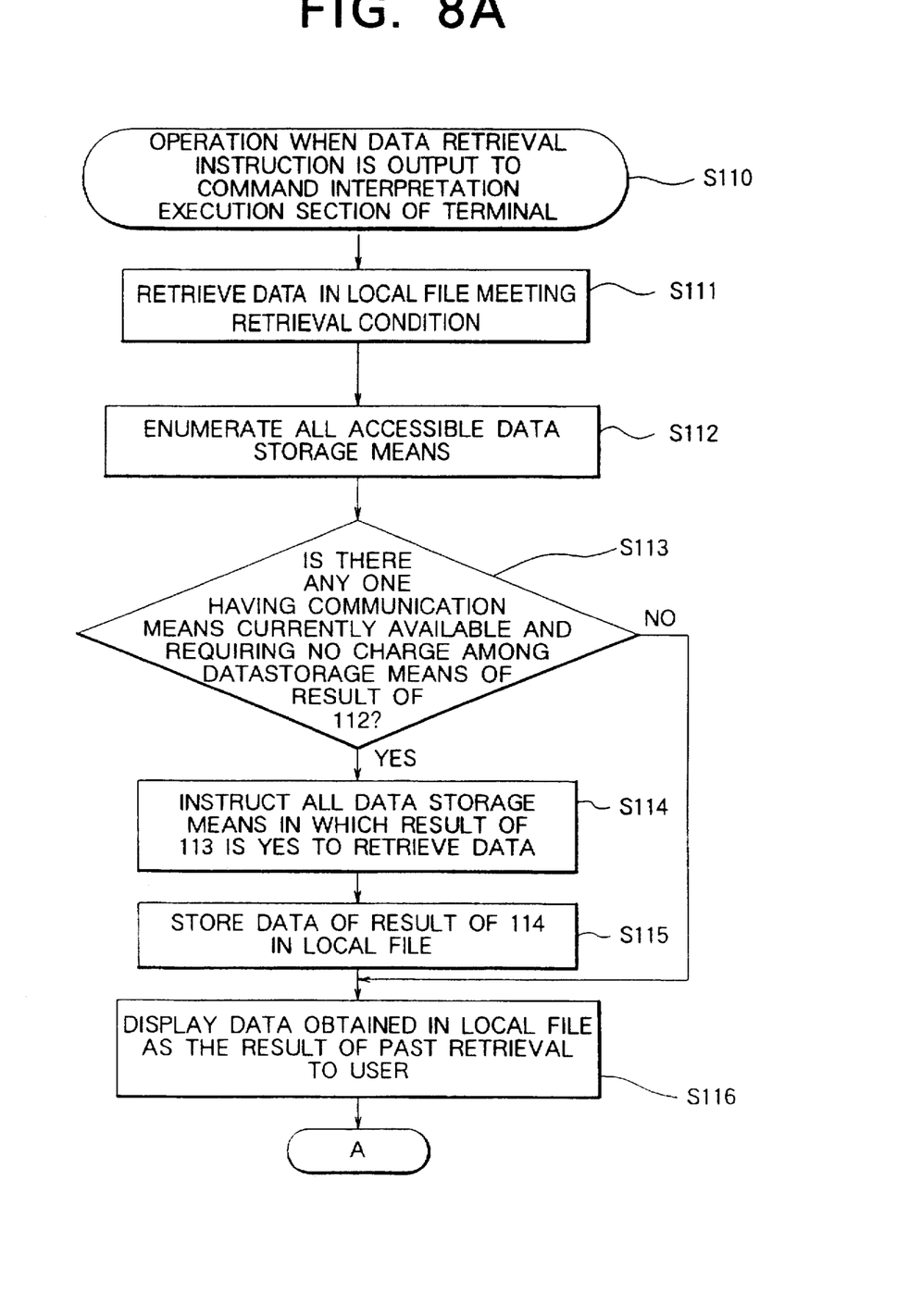
FIG. 8A is a flowchart showing an embodiment of the operation when data is retrieved from a terminal.
Figure 8B:
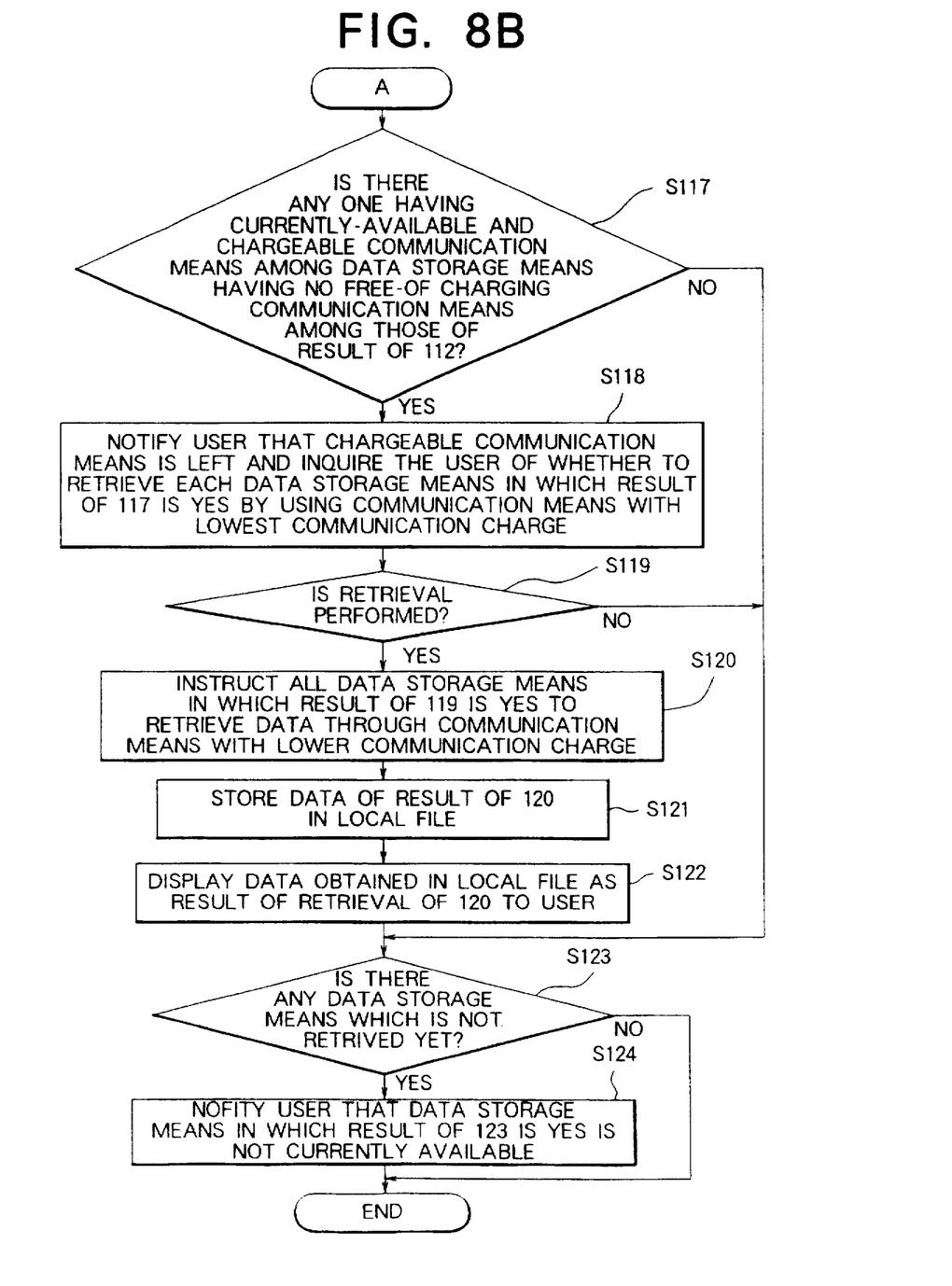
FIG. 8B is a flowchart showing an embodiment of the operation when data is retrieved from a terminal.
Figure 9A:
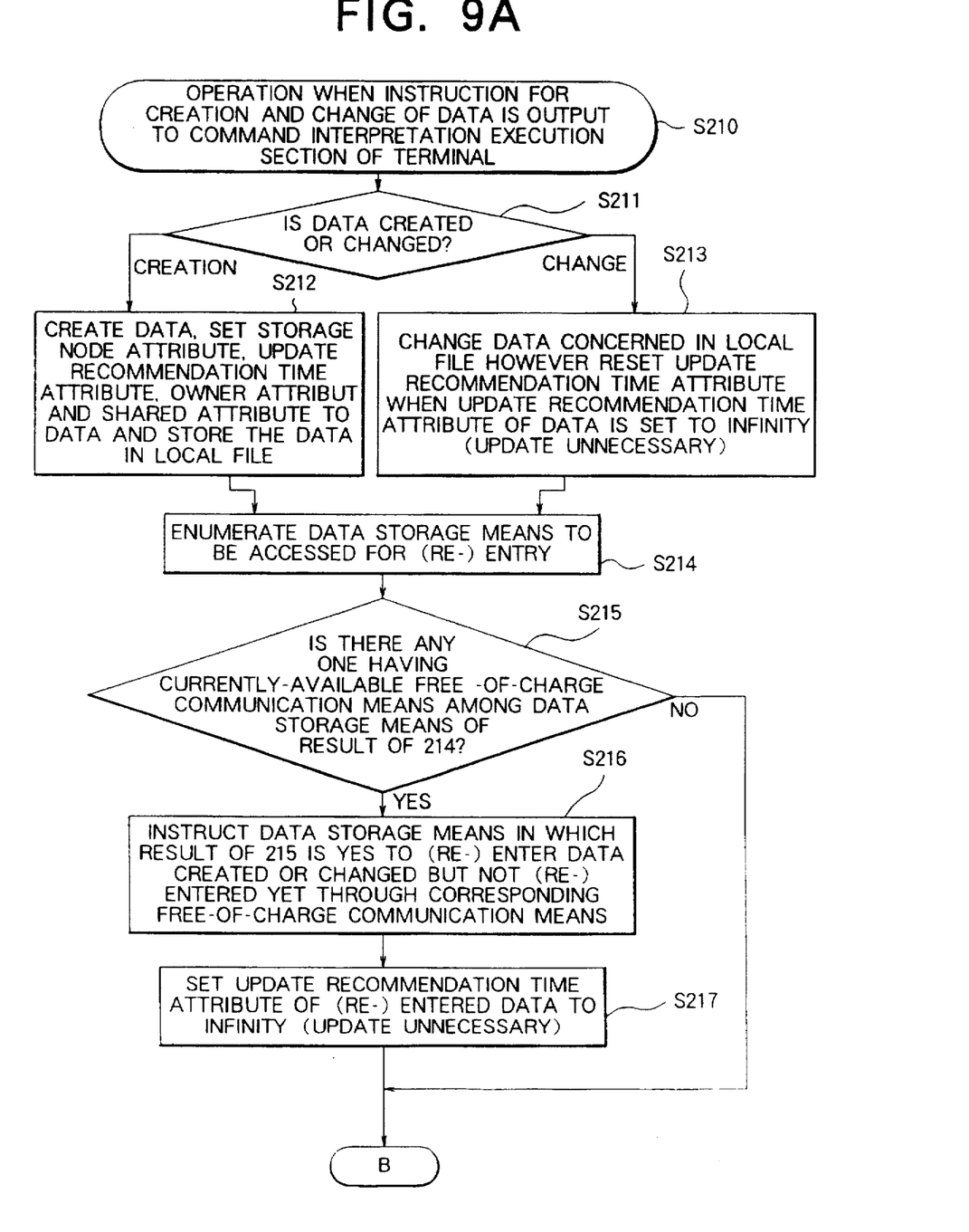
FIG. 9A is a flowchart showing an embodiment of the operation when data is created and changed at a terminal.
Figure 9B:
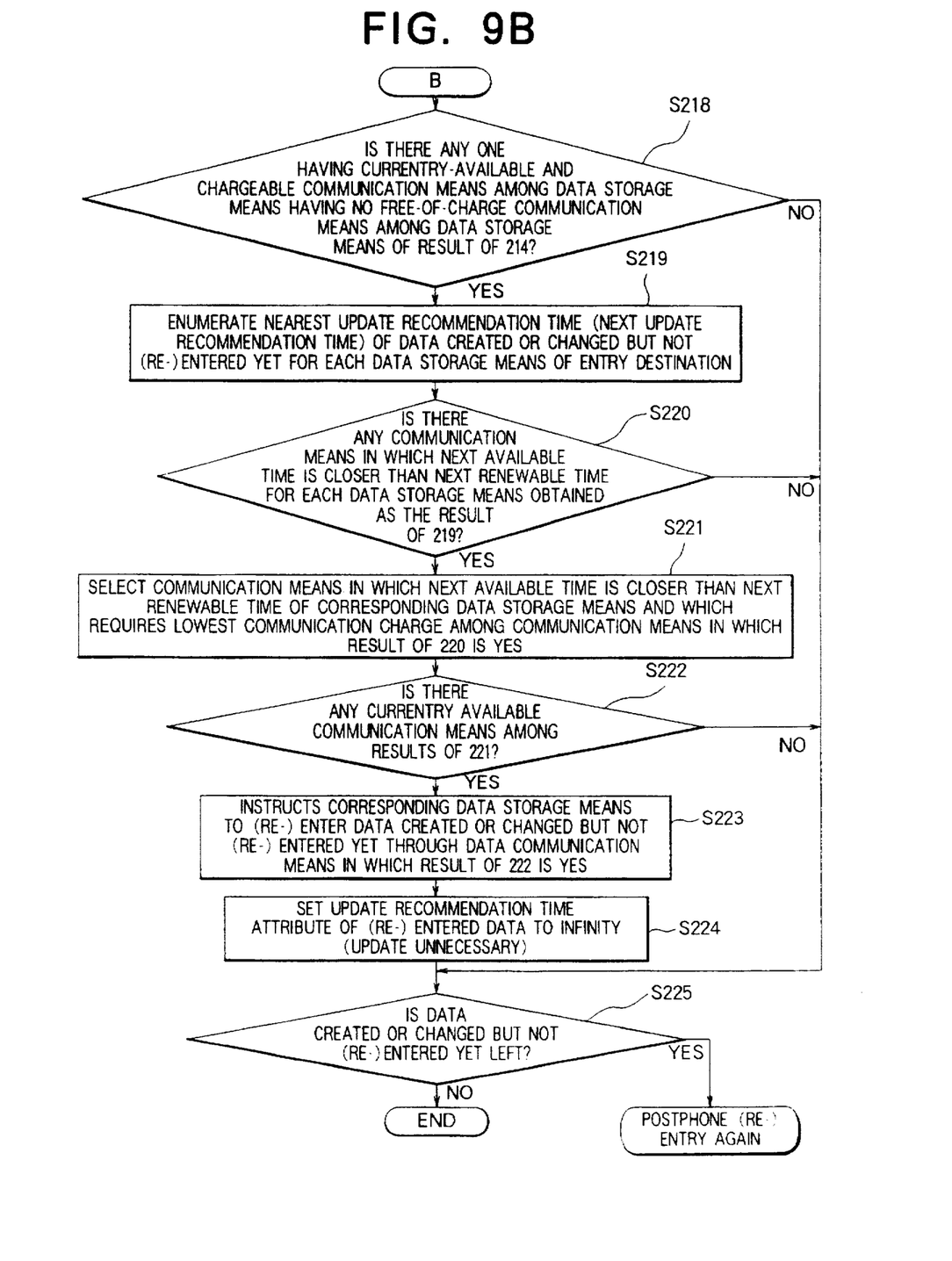
FIG. 9B is a flowchart showing an embodiment of the operation when data is created and changed at a terminal.

Moreover, when the procedure of the flowcharts in FIGS. 8A and 8B are executed though the data whose entry or reentry is postponed is present in the procedure of the flowcharts in FIGS. 9A and 9B and when there is free-of-charge communication means to the data storage means for entry or reentry in the decision processing in S112, the data can be entered or reentered between the processings S113 and S114 or between the processings S115 and S116. Among communication means to the data storage means storing the data whose entry or reentry is postponed, postponed entry or reentry of data can be applied to a communication means of which the available-link discrimination means of the communication management section can immediately detect the time of becoming available (the above type of carrier detection can be made by most local area networks including local talk) immediately when the communication means becomes available if it is free of charge.

The present invention makes it possible for a user to imaginarily utilize large-volume data obtained by summing the data in all data storage means through a terminal. Therefore, by providing a mechanism for performing entry or entry of data without direct instructions by a user, the backup of past data is automatically accumulated in a master file and the secondary advantage is obtained that the labor of backup against a failure at each terminal is reduced.

Moreover, when it is estimated that retrieval takes a time in the procedure of the flowcharts in FIGS. 8A and 8B, it is possible to decrease the communication cost by temporarily disconnecting communication means after the processing in S120, then reconnecting the communication means from the data storage means side after the retrieval is completed, and progressing the processings in S121 downward.

In the case of this embodiment, data whose entry or reentry is unnecessary is erased among the data earliest accessed (read or written) in the local file when the storage capacity limit of the local file is exceeded at the time of writing data in the local file in the processings in S115 and S121 in the procedure of the flowcharts in FIGS. 8A and 8B or the processing in S212 in the procedure of the flowchart in FIG. 9A. This is because purposed data blocks are limited to those whose entry or reentry is unnecessary in the known Least Recently Used control method in the cache block replacement control method.

When the shared attribute of data shows that the data is shareable and moreover, the data is updated in this embodiment, the contradiction of data processing between users such as the fact that a user changes the data currently used by another user is prevented by changing creation time attributes and thereby handling the data as another data (or another version of the same data). This conforms to the known multiversion method in the data base system copy management method.

Many widely different embodiments of the present invention may be constructed without departing from the spirit and scope of the present invention. It should be understood that the present invention is not limited to the specific embodiments described in the specification, except as defined in the appended claims.

What is claimed is:

1. A data management system comprising:

information terminal means including first storage means for storing local data, local data management means for managing said local data, and first communication management means; and data storage means remote from said information terminal means for storing necessary data for said information terminal, said data storage means being provided with second storage means for storing master data, master data management means for managing said master data, and second communication management means; wherein said first communication management means selects at least one of a plurality of communication means operatively connecting said information terminal to said data storage means, and communication time when communication from said information terminal means to said data storage means is necessary, and said second communication management means selects at least one of said communication means and communication time when communication from said data storage means to said information terminal means is necessary, said first and second communication means each further comprising available-link discrimination means and communication-time decision means for selecting said communication time.

2. A data management system according to claim 1, wherein the communication-time decision means selects communication time in accordance with information on a communication means attribute table including information of communication cost attribute and information of next available time attribute.

3. A data management system according to claim 1, wherein said local data management means and said master data management means are respectively provided with data attribute access means for accessing the attribute of the data to be managed.

4. A data management system according to claim 2, wherein said local data management means and said master data management means are respectively provided with data attribute access means for accessing the attribute of the data to be managed.

5. A data management system, comprising:

a first information processing terminal to be utilized by a first user, comprising: a first storage unit for storing local data; first data management means for managing data stored in said first storage unit; and first communication management means for controlling communication of said first information processing terminal;

data storage means separate from said first information processing terminal, said data storage means comprising: a second storage unit for storing master data of said first information processing terminal; second data management means for managing data stored in said second storage unit; and second communication management means for controlling communication of said data storage means;

a computer separate from said first information processing terminal and said data storage means, and being accessible to a first and second user, said computer comprising: a second information processing terminal to be used by said second user; a third storage unit for storing master data of said first information processing terminal and master data of said second information processing terminal; third data management means for managing data stored in said third storage unit; third communication means for controlling communication of said computer; and a bus connecting said second information processing terminal to said computer; and a plurality of communication means for connecting said first information processing terminal, said data storage means and said computer together, wherein said first, second and third communication management means are provided with available-link discrimination means and communication-time decision means, and selects one of said communication means and communication time in accordance with information from said available-link discrimination means and said communication-time decision means when communications are necessary.

6. A data management system, comprising:

an information terminal comprising a local data storage unit, a local data manager and a first communication manager;

a remote data storage unit operatively coupled to said information terminal, said remote data storage unit storing necessary data for said information terminal and including a master data storage unit, a master data manager and a second communication manager, wherein said first communication manager selects one of a plurality of available communication means for providing communication between said information terminal and said remote data storage unit, and a communication time when communication from said information terminal to said remote data storage unit is necessary, and said second communication manager selects one of said plurality of available communication means and a communication time when communication from said remote data storage unit to said information terminal is necessary, said first and second communication manager each comprising an available-link discriminator and a communication-time selector for selecting a communication time.

7. The data management system of claim 6, wherein said communication-time selector selects communication time based on information in a communication means attribute table, said table including a communication cost attribute and a next available time attribute.

8. The data management system of claim 6, wherein said local data manager and said master data manager each include data attribute access means for accessing an attribute of the data to be managed.

9. The data management system of claim 7, wherein said local data manager and said master data manager each include data attribute access means for accessing an attribute of the data to be managed.

* * * * *